(12) United States Patent
Kondo et al.

(10) Patent No.: US 10,752,296 B2
(45) Date of Patent: Aug. 25, 2020

(54) VEHICLE BODY FRONT STRUCTURE

(71) Applicant: HONDA MOTOR CO., LTD., Tokyo (JP)

(72) Inventors: Takehiro Kondo, Wako (JP); Akira Haga, Wako (JP); Akihisa Kudoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/321,989

(22) PCT Filed: Jun. 14, 2017

(86) PCT No.: PCT/JP2017/021894
§ 371 (c)(1),
(2) Date: Jan. 30, 2019

(87) PCT Pub. No.: WO2018/025509
PCT Pub. Date: Feb. 8, 2018

(65) Prior Publication Data
US 2019/0168816 A1    Jun. 6, 2019

(30) Foreign Application Priority Data
Aug. 1, 2016  (JP) ................. 2016-151040

(51) Int. Cl.
*B62D 25/08* (2006.01)
*B62D 21/09* (2006.01)
*B62D 25/02* (2006.01)

(52) U.S. Cl.
CPC .......... *B62D 25/082* (2013.01); *B62D 21/09* (2013.01); *B62D 25/088* (2013.01); *B62D 25/02* (2013.01)

(58) Field of Classification Search
CPC ............................ B62D 25/082; B62D 25/088
(Continued)

(56) References Cited

U.S. PATENT DOCUMENTS 4,822,096 A * 4/1989 Fujii .................... B62D 25/082
                                                          296/203.02
4,955,663 A   9/1990 Imura
(Continued)

FOREIGN PATENT DOCUMENTS

EP     2433850 A1     3/2012
JP    S64-022686 U   2/1989
(Continued)

OTHER PUBLICATIONS

International Search Report by ISA/JP dated Sep. 12, 2017, on PCT/JP2017/021894 (5 pages).
(Continued)

*Primary Examiner* — Gregory A Blankenship
(74) *Attorney, Agent, or Firm* — Rankin, Hill & Clark LLP

(57) ABSTRACT

A vehicle body front structure includes: a damper base to which a damper is fixed; a damper housing surrounding the damper base and extending downward along a periphery of the damper base; a front side frame extending in a vehicle front-rear direction and joined to a lower end portion of the damper housing, and a reinforcing member connecting the damper base to the front side frame in a vertical direction. The reinforcing member has a vertically elongated shape with a hat-shaped cross section and has a joint flange corresponding to a periphery portion of the cross section. The joint flange is joined to a side surface of the damper housing. The damper housing and the reinforcing member define a closed cross section whose cross-sectional area increases in a downward direction. The joint flange has an upper end portion joined to an upper surface of the damper base and has a lower end portion joined to an upper surface and a side surface of the front side frame.

8 Claims, 12 Drawing Sheets

(58) Field of Classification Search
USPC .............................. 296/187.09, 198, 203.02
See application file for complete search history.

(56) References Cited

U.S. PATENT DOCUMENTS

| | | | | |
|---|---|---|---|---|
| 5,052,742 | A * | 10/1991 | Akoshima | B62D 25/081 |
| | | | | 296/192 |
| 5,244,248 | A * | 9/1993 | Bovellan | B62D 21/152 |
| | | | | 296/187.09 |
| 5,913,565 | A * | 6/1999 | Watanabe | B62D 21/152 |
| | | | | 296/187.03 |
| 6,209,950 | B1 * | 4/2001 | Hanyu | B62D 25/04 |
| | | | | 296/203.02 |
| 8,240,747 | B2 | 8/2012 | Kim | |
| 8,777,300 | B2 | 7/2014 | Kim et al. | |
| 2004/0056515 | A1 | 3/2004 | Nomura | |
| 2006/0006699 | A1 * | 1/2006 | Matsuyama | B62D 25/088 |
| | | | | 296/203.02 |
| 2007/0215402 | A1 * | 9/2007 | Sasaki | B62D 25/088 |
| | | | | 180/232 |
| 2009/0230665 | A1 * | 9/2009 | Tamura | B62D 25/088 |
| | | | | 280/785 |
| 2014/0049072 | A1 * | 2/2014 | Kim | B62D 25/088 |
| | | | | 296/193.09 |
| 2014/0367994 | A1 | 12/2014 | Sasaki et al. | |
| 2015/0166117 | A1 * | 6/2015 | Ohoka | B62D 25/08 |
| | | | | 296/193.09 |
| 2016/0107593 | A1 * | 4/2016 | Park | B62D 25/088 |
| | | | | 296/198 |
| 2017/0369102 | A1 * | 12/2017 | Kim | B62D 21/152 |
| 2019/0009830 | A1 * | 1/2019 | Kondo | B60G 13/003 |
| 2019/0168816 | A1 * | 6/2019 | Kondo | B62D 21/09 |
| 2019/0291787 | A1 * | 9/2019 | Tsukamoto | B62D 25/2027 |
| 2019/0300067 | A1 * | 10/2019 | Ogawa | B62D 25/18 |
| 2020/0108872 | A1 * | 4/2020 | Kondo | B60K 5/12 |
| 2020/0122777 | A1 * | 4/2020 | Kondo | B62D 25/08 |
| 2020/0122780 | A1 * | 4/2020 | Muramatsu | B62D 25/08 |

FOREIGN PATENT DOCUMENTS

| | | |
|---|---|---|
| JP | H08-310445 A | 11/1996 |
| JP | 2000-211552 A | 8/2000 |
| JP | 2004-106704 A | 4/2004 |
| JP | 2006-021590 A | 1/2006 |
| JP | 2007-245859 A | 9/2007 |
| JP | 2010-111200 A | 5/2010 |
| JP | 2012-071648 A | 4/2012 |
| WO | 2013105321 A1 | 7/2013 |

OTHER PUBLICATIONS

Written Opinion by ISA/JP dated Sep. 12, 2017, on PCT/JP2017/021894 (6 pages).

* cited by examiner

VEHICLE BODY FRONT STRUCTURE

TECHNICAL FIELD

The present invention relates to a vehicle body front structure which enhances the vertical rigidity of left and right damper bases independently of each other to improve ride quality.

BACKGROUND ART

Conventionally, examples of vehicle body front structures of the above described kind include those described in Patent Documents 1 and 2.

In the vehicle body front structure described in Patent Document 1, a gate-shaped frame is constructed with left and right leg portions located on the sides of damper housings and a reinforcing member connecting upper ends of the leg portions to enhance the rigidity of the vehicle front portion.

In the vehicle body front structure described in Patent Document 2, a damper housing and a damper base are connected to a side frame with two reinforcing members to enhance the rigidity of the vehicle front portion.

PRIOR ART DOCUMENT

Patent Document

Patent Document: U.S. Pat. No. 8,240,747
Patent Document: U.S. Pat. No. 8,777,300

SUMMARY OF INVENTION

Problems to be Solved by Invention

With the structure described in Patent Document 1, when a push-up force is applied to the damper base on one damper housing from a damper, the push-up force is also applied to the other damper base from the damper. As a result, the ride quality gets worse.

With the structure described in Patent Document 2, as two reinforcing members are connected to the damper base and damper housing, the structure is increased in weight.

The present invention has been made to solve such problems and it is an object of the invention to provide a vehicle body front structure that can enhance the vertical rigidity of left and right damper bases independently of each other with a lightweight structure to improve ride quality.

Solution to Problem

To achieve the above described object, the present invention provides a vehicle body front structure including: a damper base to which a damper is fixed; a damper housing surrounding the damper base and extending downward along a periphery of the damper base; a front side frame extending in a vehicle front-rear direction and joined to a lower end portion of the damper housing; and a reinforcing member connecting the damper base to the front side frame in a vertical direction. The reinforcing member has a vertically elongated shape with a hat-shaped cross section and has a joint flange corresponding to a periphery portion of the hat shaped cross section. The joint flange is joined to a side surface of the damper housing and the damper housing and the reinforcing member define a closed cross section whose cross-sectional area increases in a downward direction. The joint flange has an upper end portion joined to an upper surface of the damper base and has a lower end portion joined to an upper surface and a side surface of the front side frame.

Advantageous Effect of Invention

The present invention provides a vehicle body front structure that can enhance the vertical rigidity of left and right damper bases independently of each other with a lightweight structure to improve ride quality.

DESCRIPTION OF EMBODIMENT

Configuration of Embodiment

Figure 1:
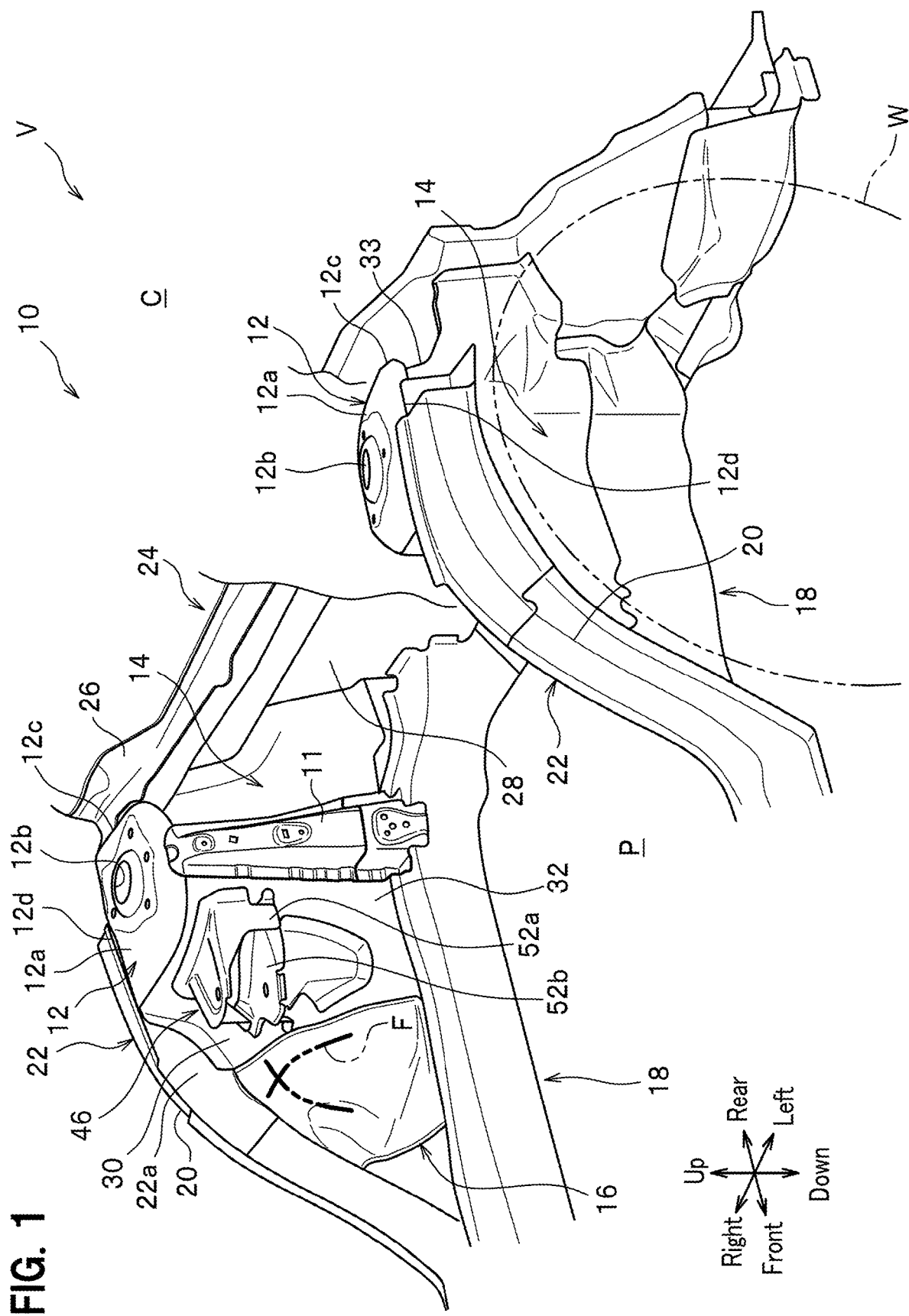
FIG. 1 is a partially omitted perspective view illustrating a vehicle to which a vehicle body front structure according to an embodiment of the present invention is applied.

An embodiment of the present invention will be described in details with reference to FIGS. 1 to 12. In the description, identical elements are assigned the same reference numerals and duplicate descriptions thereof are omitted. In each figure, "Front" and "Rear" correspond to vehicle frontward and rearward directions, "Left" and "Right" correspond to a vehicle width directions (left direction and right direction), and "Up" and "Down" correspond to upward and downward vertical directions.

As shown in FIG. 1, a vehicle V has a power plant room P in which a power unit such as an engine not shown is accommodated and a vehicle compartment C where passengers get in. A vehicle body front structure 10 according to the present embodiment is characterized in that the power plant room P is provided with a reinforcing member 11 that connects a damper base 12, a damper housing 14, and a front side frame 18, which are disposed in this order downward, in an up-down direction. It should be noted that, in FIG. 1, "W" indicates a left front wheel. In addition, only the reinforcing member 11 on the right side is illustrated.

The vehicle body front structure 10 has: a left-right pair of damper bases 12 to each of which a damper of a suspension mechanism not shown is fixed; a left-right pair of damper housings 14 each of which surrounds corresponding one of the damper bases 12 and extends downward along a periphery of the corresponding one of the damper bases 12; a left-right pair of front side frames 18 each of which is joined to a lower end portion of corresponding one of the damper housings 14; and a left-right pair of reinforcing members 11 that connects those constituent elements in the up-down direction.

The left-right pair of damper bases 12, the left-right pair of damper housings 14, and the left-right pair of front side frames 18, and the left-right pair of reinforcing members 11 are each left-right symmetric. For this reason, the damper base 12, damper housing 14, front side frame 18, and reinforcing member 11 which are arranged on the right side of the vehicle V will be hereinafter described, and description of those on the left side is omitted.

The vehicle body front structure 10 further has a left-right pair of lower members (lateral frames) 22 each having a curved portion 20 and respectively disposed on the outer sides of the pair of front side frames 18 in the vehicle width direction, which are respectively disposed on the left and right sides of the power plant room P. In addition, the vehicle body front structure has a left-right pair of damper housing extensions 16 each of which is located on the front side of corresponding one of the damper housings 14 in the vehicle front-rear direction and extends continuously from the corresponding one of the damper housings 14.

Figure 4:
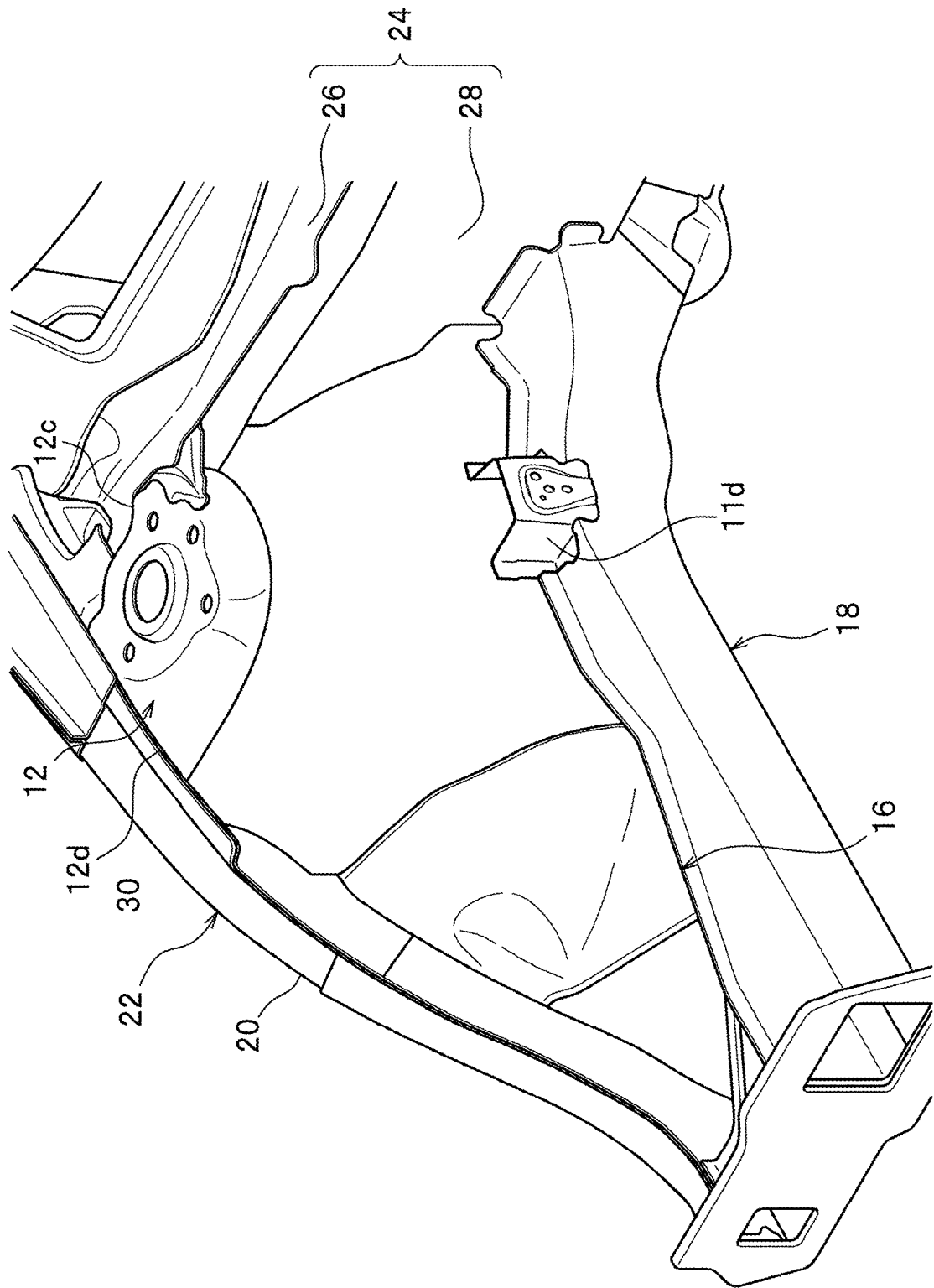
FIG. 4 is a perspective view illustrating the front side frame to which a lower portion member of the reinforcing member is joined.

The vehicle body front structure 10 further has a dashboard 24 that separates the vehicle compartment C from the power plant room P. This dashboard 24 is disposed on a rear side of the left-right pair of front side frames 18 in the vehicle front-rear direction and, as shown in FIG. 4, includes: a dashboard upper 26 that constitutes an upper portion of the dashboard 24; and a dashboard lower 28 that constitutes a lower portion of the dashboard 24.

Each front side frame 18 is a frame member having a hollow cross-sectional structure (see FIG. 9) and extending in the vehicle front-rear direction below the corresponding lower member 22. The front side frame 18 has a front end portion connected to a front bulkhead not shown. The front side frame 18 has a rear end portion connected to a lower end side of the dashboard lower 28.

As shown in FIG. 1, each lower member 22 is a frame member having a hollow cross-sectional structure (see FIG. 9) and extending in the vehicle front-rear direction. The lower member 22 has the curved portion 20, which gradually curves downward as it extends in a vehicle forward direction. The lower member 22 has a front end portion connected via a gusset to the corresponding front side frame 18 and has a rear end portion connected to a front pillar not shown.

Figure 2:
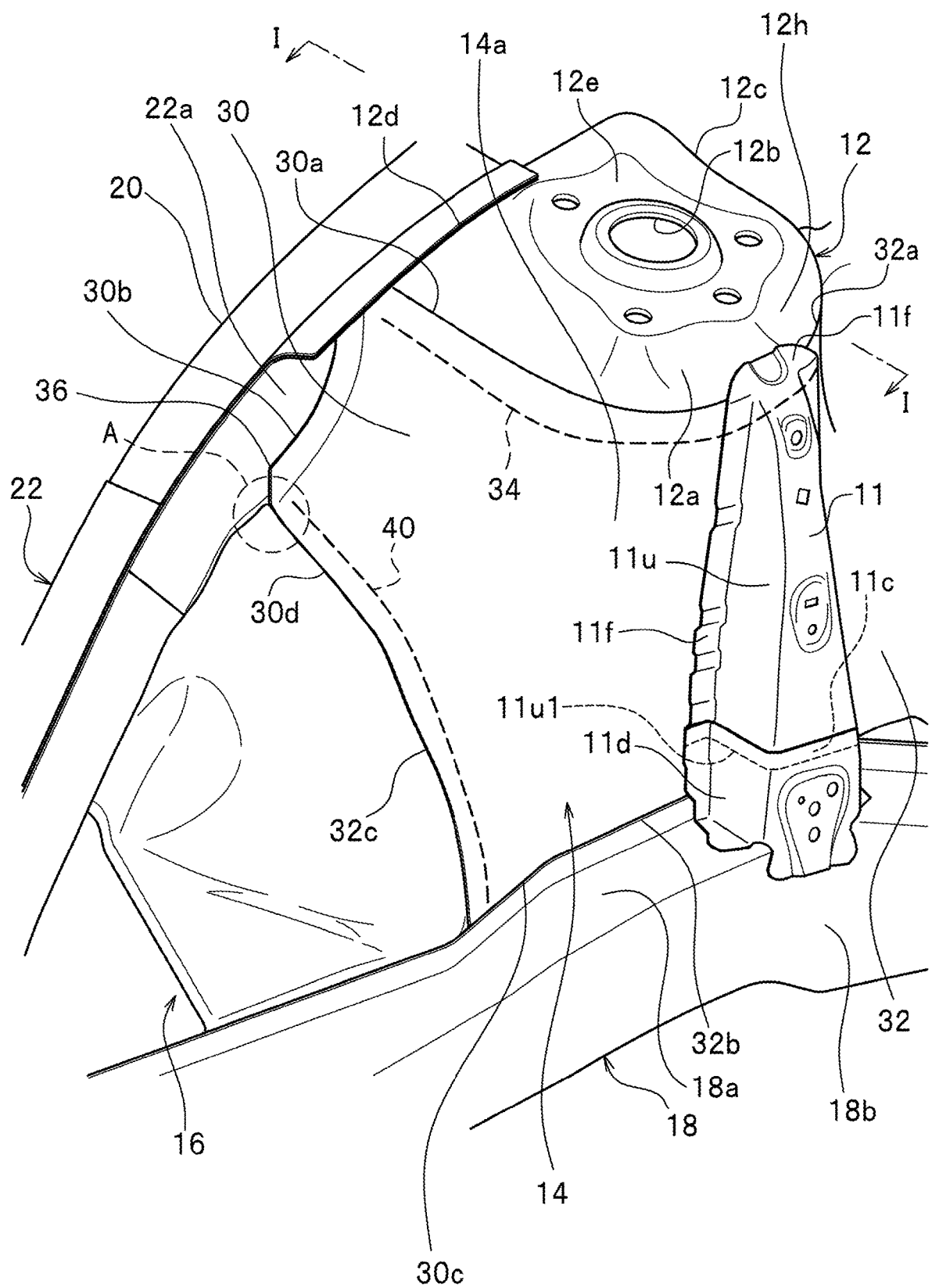
FIG. 2 is an enlarged perspective view of FIG. 1, illustrating a damper base, a damper housing, a front side frame, and a reinforcing member of the vehicle body front structure of the present embodiment.

As shown in FIG. 2, the damper housing 14 includes: a front wall 30 with a front surface that faces in the vehicle forward direction from the damper base 12; a side wall 32 with a side surface that faces inward in the vehicle width direction from the damper base 12; and a rear wall 33 (see FIGS. 3 and 10) with a rear surface that faces in the vehicle rearward direction from the damper base 12. The damper housing 14 has an upper portion to which the damper base 12 is welded and fixed. The damper base 12 has a base body 12a with a periphery portion where a joint flange 34 is formed by bending the periphery portion downward (see FIG. 7). The base body 12a has a central portion with an opening 12b through which a protrusion provided on a head portion of the damper not shown is to be inserted.

The reinforcing member 11 has a vertically elongated shape with a hat-shaped cross section (FIG. 6) and has a joint flange 11f corresponding to a periphery portion of the hat-shaped cross section. The reinforcing member 11 connects the damper base 12 located above to the front side frame 18 located below, in the vertical direction. The joint flange 11f of the reinforcing member 11 is joined to a side surface 14a of the damper housing 14. The reinforcing member 11 defines a closed cross section the cross-sectional area of which increases in the downward direction. The reinforcing member 11 has a shape such that a dimension along the vehicle width direction increases from an upper end of the reinforcing member 11 to a lower end thereof and that a dimension along the vehicle front-rear direction increases from an upper end of the reinforcing member 11 to a lower end thereof. Moreover, the joint flange 11f of the reinforcing member 11 has an upper end portion joined to an upper surface (slanted surface 12h) of the damper base 12 and has a lower end portion joined to an upper surface 18a and a side surface 18b of the front side frame 18.

Figure 3:
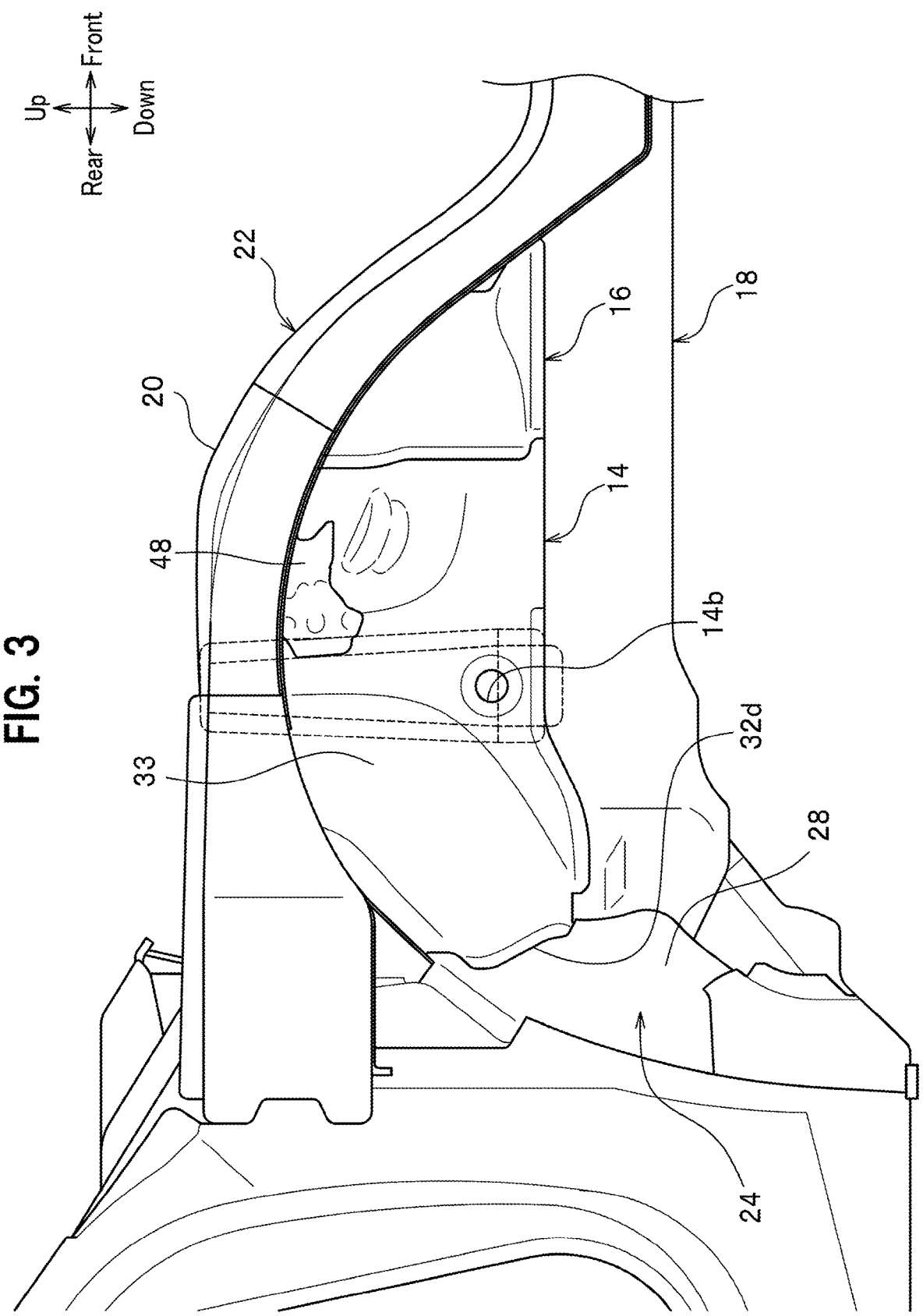
FIG. 3 is a side view illustrating a vehicle front-rear direction rear end of the damper housing.

The reinforcing member 11 is made up of two members, i.e., a lower portion member 11d and an upper portion member 11u. The lower portion member 11d is joined to the front side frame 18. The upper portion member 11u has a lower end portion 11u1 overlapped with an upper end portion of the lower portion member 11d on a vehicle outer side of the lower portion member 11d, and is joined to the damper housing 14. The reinforcing member 11 has an overlapping section 11c where the lower end portion 11u1 of the upper portion member 11u is overlapped with the upper end portion of the lower portion member 11d on the vehicle outer side of the lower portion member 11d. A work hole 14b, shown in FIG. 3, is formed on the damper housing 14 so as to face the overlapping section 11c. This configuration enables working of spot welding described as follows. As shown in FIG. 4, the lower portion member 11d is fixed to the front side frame 18 in advance. Then, the damper housing 14 to which the upper portion member 11u has been fixed in advance is set to the lower portion member 11d from the outside of the vehicle as shown by the arrow Y1 in FIG. 5 in such a way that the upper portion member 11u is overlapped with the lower portion member 11d on the vehicle outer side of the lower portion member 11d at the overlapping section 11c. Then, spot welding (mark X in FIG. 6) can be performed on the overlapping section 11c by inserting a welding jig through the work hole 14b (see FIG. 6).

Figure 5:
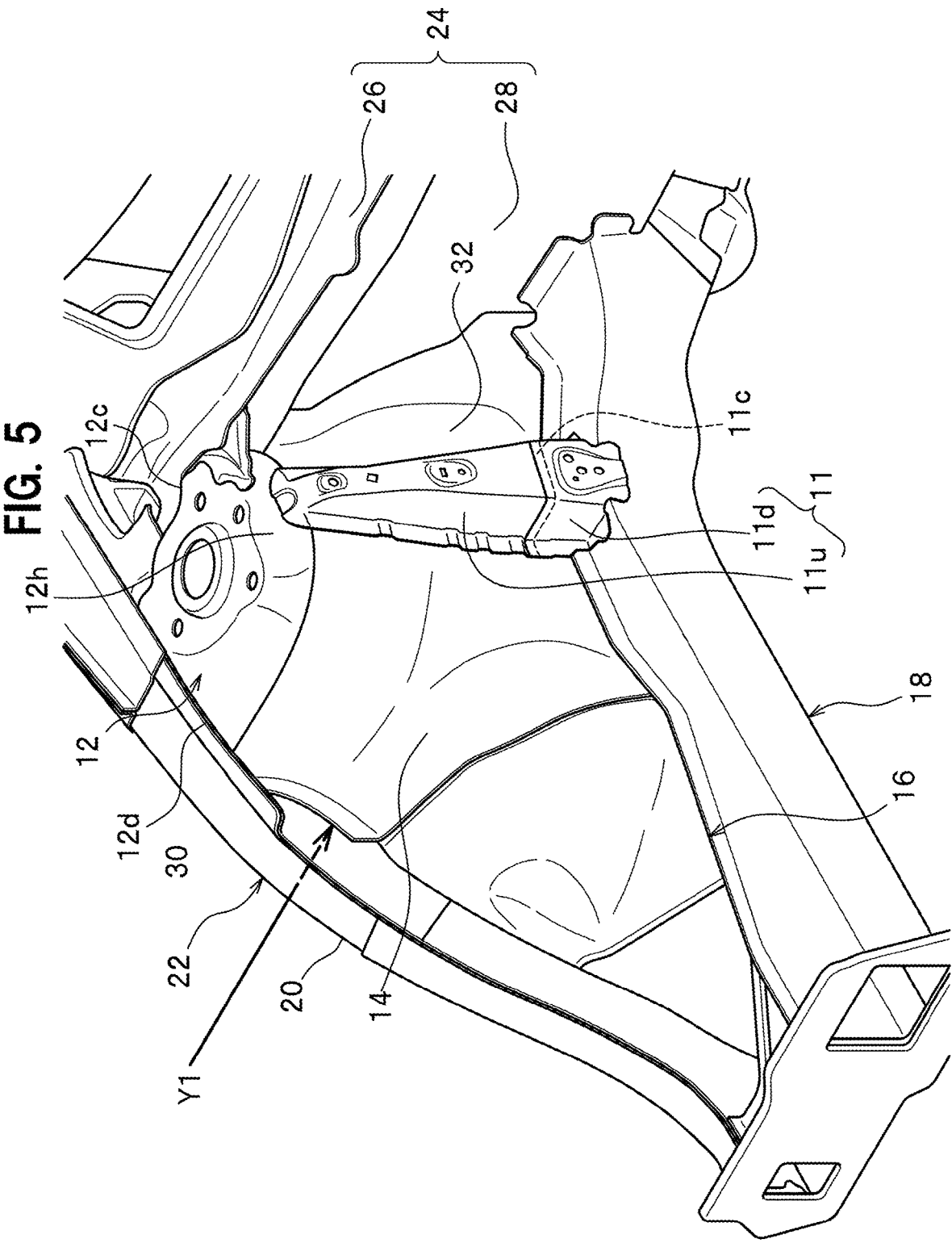
FIG. 5 is a perspective view illustrating a joint state of the damper housing where an upper portion member of the reinforcing member is joined to the lower portion member of the reinforcing member joined to the front side frame.
Figure 6:
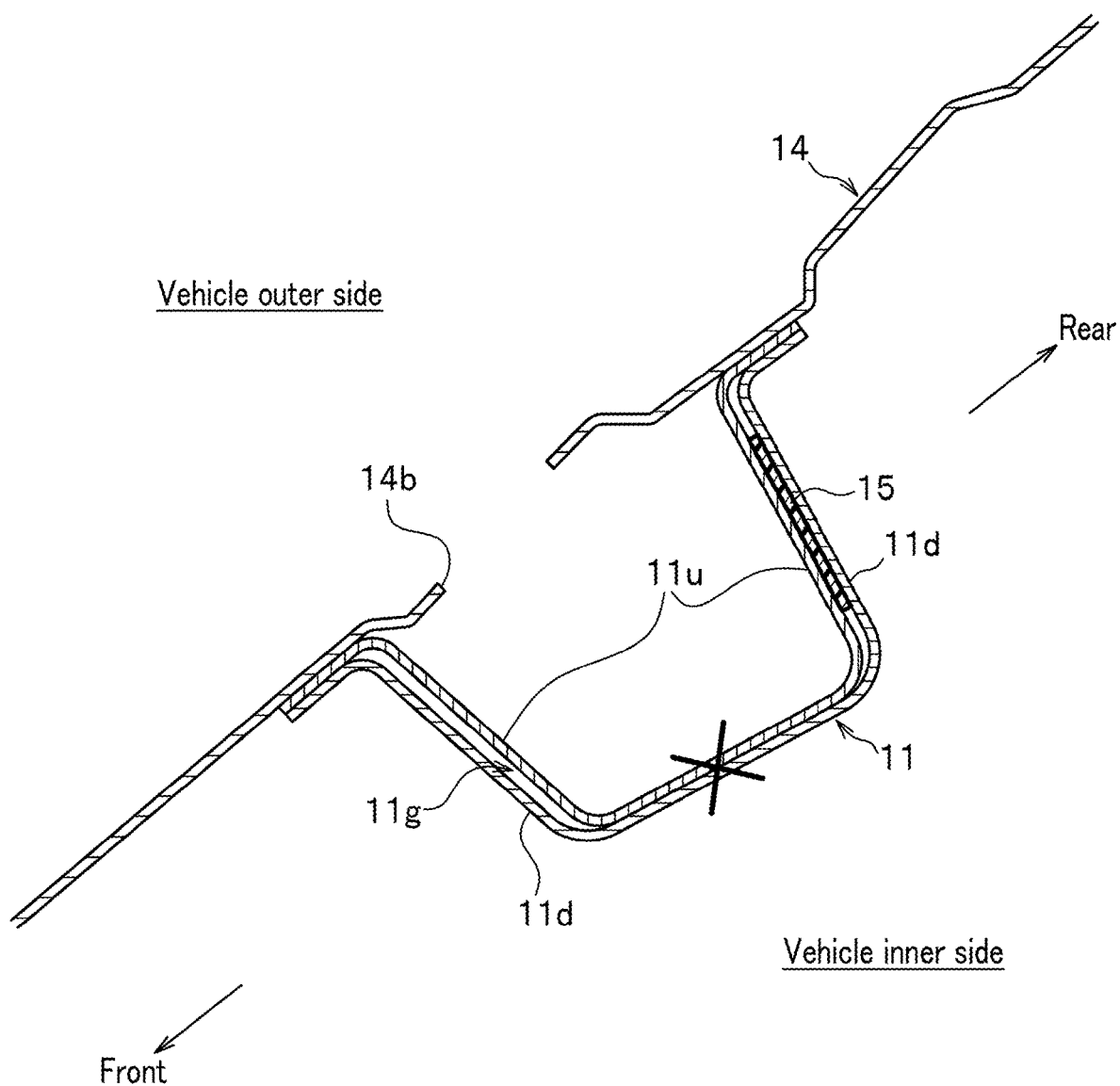
FIG. 6 is a cross-sectional view illustrating a horizontal cross section of an overlapping section of the reinforcing member illustrated in FIG. 5.

FIG. 6 is a cross-sectional view illustrating a horizontal cross section of the overlapping section 11c of the reinforcing member 11 shown in FIG. 5. As shown in FIG. 6, it is difficult to perform the above-described spot welding on the vehicle rear side of the overlapping section 11c because the outer peripheral edge of the work hole 14b does not extend thereto. For this reason, on the rear side of the overlapping section 11c, the lower portion member 11d is glued to the upper portion member 11u with an adhesive 15 therebetween.

As shown in FIG. 6, on the front side of the overlapping section 11c, the lower portion member 11d and the upper portion member 11u define a gap 11g therebetween.

Figure 7:
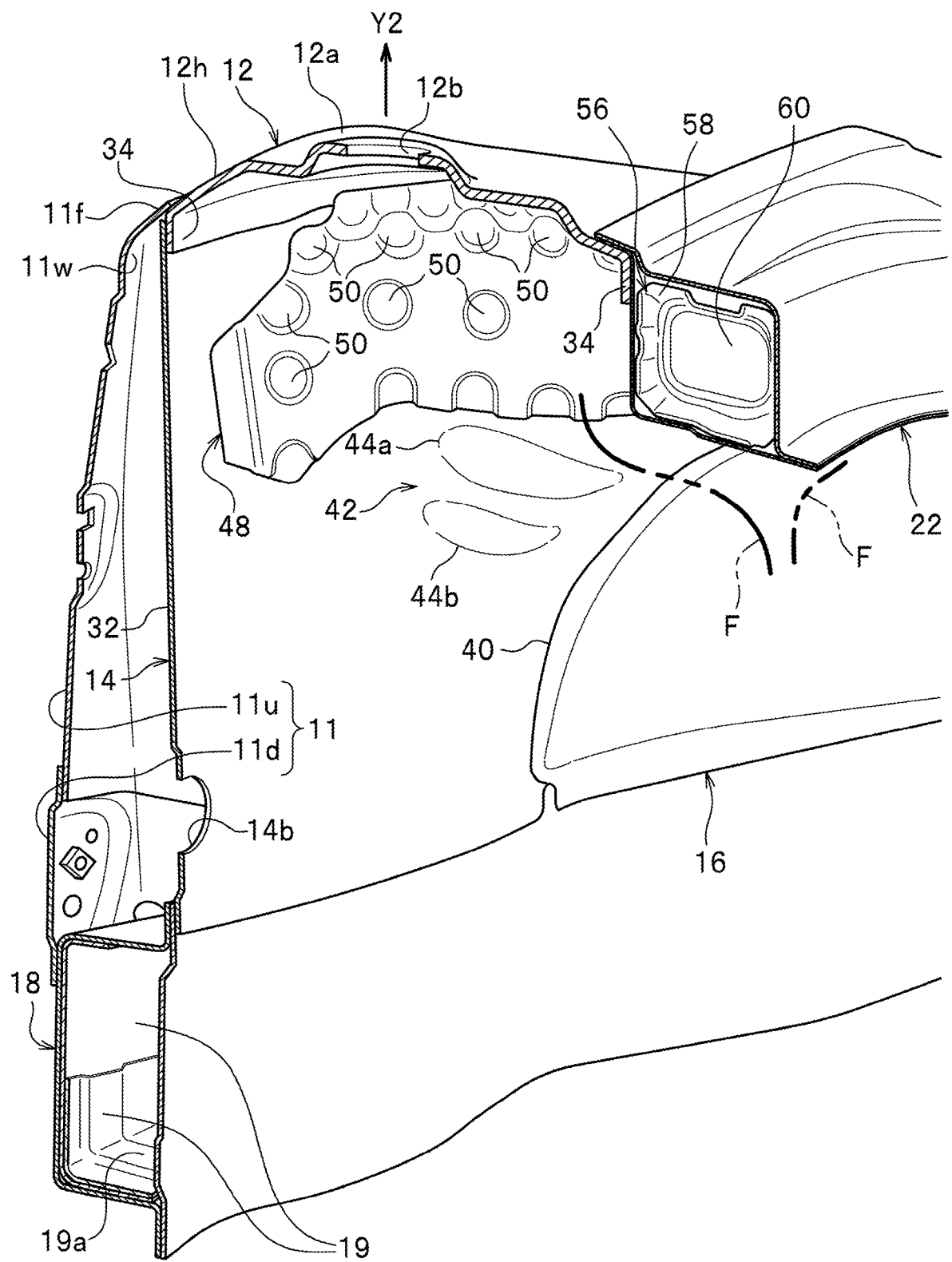
FIG. 7 is a vertical cross-sectional view taken along line I-I in FIG. 2.
Figure 8:
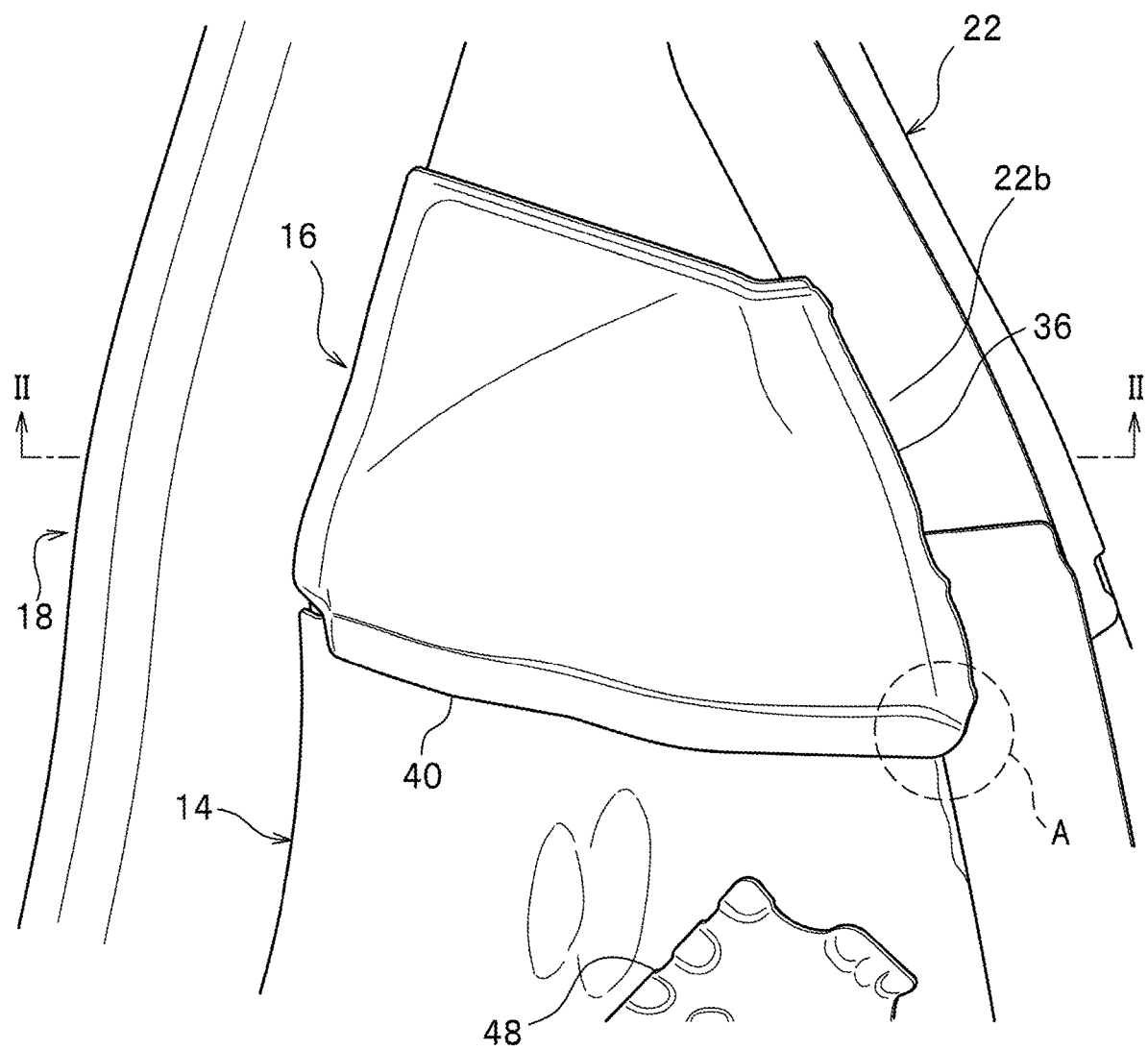
FIG. 8 is a bottom view of the damper housing as viewed from the bottom side of the vehicle.
Figure 9:
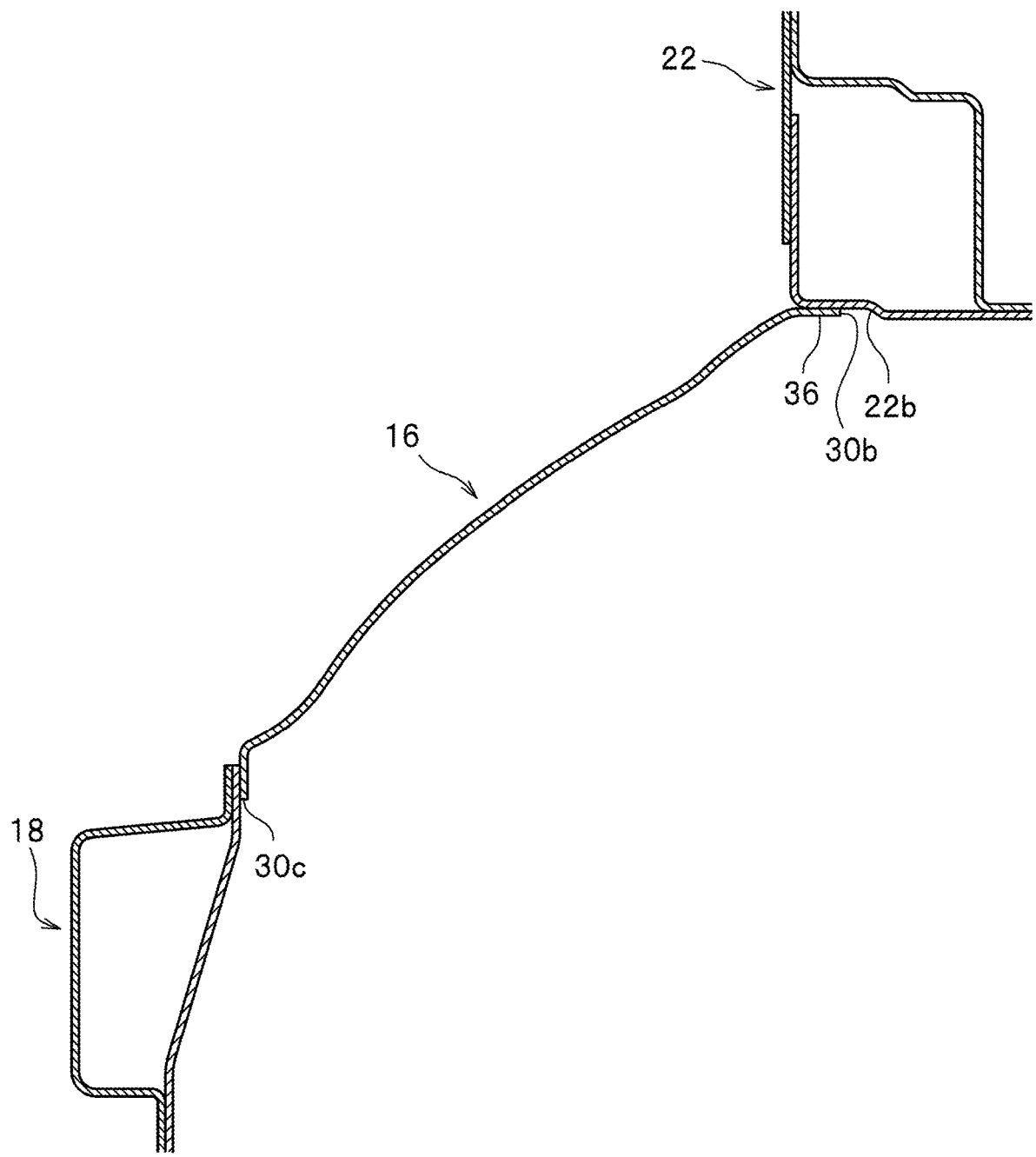
FIG. 9 is an end view taken along line II-II in FIG. 8.

As shown in FIG. 7, the lower portion member 11d is joined to a side surface of the front side frame 18, and a plate-like reinforcing member 19 serving as another reinforcing member is joined to an inner surface (inner side surface) opposite to that side surface. The plate-like reinforcing member 19 is made up of two overlapped sheets that are bent in accordance with the shape of the inner side surface, an inner upper surface, and an inner lower surface of the front side frame 18. The lower portion member 11d of the reinforcing member 11 is joined to the front side frame 18 so that the front side frame 18 is sandwiched between the lower portion member 11d and the plate-like reinforcing member 19. Incidentally, the plate-like reinforcing member 19 may be made up of a single sheet or three or more overlapping sheets. The plate-like reinforcing member 19 has been strengthened by forming a beaded portion 19a thereon.

As shown in FIG. 2, the damper base 12 has: a flat surface 12e around an upper peripheral edge of the opening 12b of the damper base 12; and a slanted surface 12h defined between the flat surface 12e and an upper surface periphery portion of the damper base 12, slanted downward from the flat surface 12e toward a periphery of the damper base 12, and having an arc shape surrounding the flat surface 12e. The joint flange 11f of the reinforcing member 11 is joined to this slanted surface 12h along a periphery portion thereof. By this joint, a curved surface 11w is defined to extend continuously in the reinforcing member 11 from the joint flange 11f to an inner surface of the reinforcing member 11, as shown in the cross section of the reinforcing member 11 shown in FIG. 7.

In the damper housing 14, an upper end 30a of the front wall 30 and an upper end 32a of the side wall 32 are joined to the joint flange 34 of the damper base 12. The front wall 30 has a vehicle width direction outer end 30b at which a joint flange 36 bent upward therefrom is provided. This joint flange 36 is joined to an inner side surface 22a of the curved portion 20 of the lower member 22. A lower end 30c of the front wall 30 and a lower end 32b of the side wall 32 are joined to an outer surface side of the front side frame 18.

The front wall 30 of the damper housing 14 has a front end 30d located on the vehicle front side of the front wall 30. The side wall 32 of the damper housing 14 has a front end 32c located on the vehicle front side of the side wall 32. The damper housing extension 16 is joined to a lower surface of the front end 30d, a lower surface of the front end 32c, a lower surface 22b (see FIG. 9) of the lower member 22, and an outer surface of the front side frame 18.

The damper housing extension 16 is joined to the damper housing 14, the lower member 22, and the front side frame 18 via an adhesive. Incidentally, those portions adhered via the adhesive may, for example, further be welded with each other by spot welding.

The front wall 30 of the damper housing 14 is formed in a curved shape such that the front surface thereof facing in the vehicle forward direction protrudes downward. The damper housing extension 16 is formed in a curved shape to protrude upward.

Figure 10:
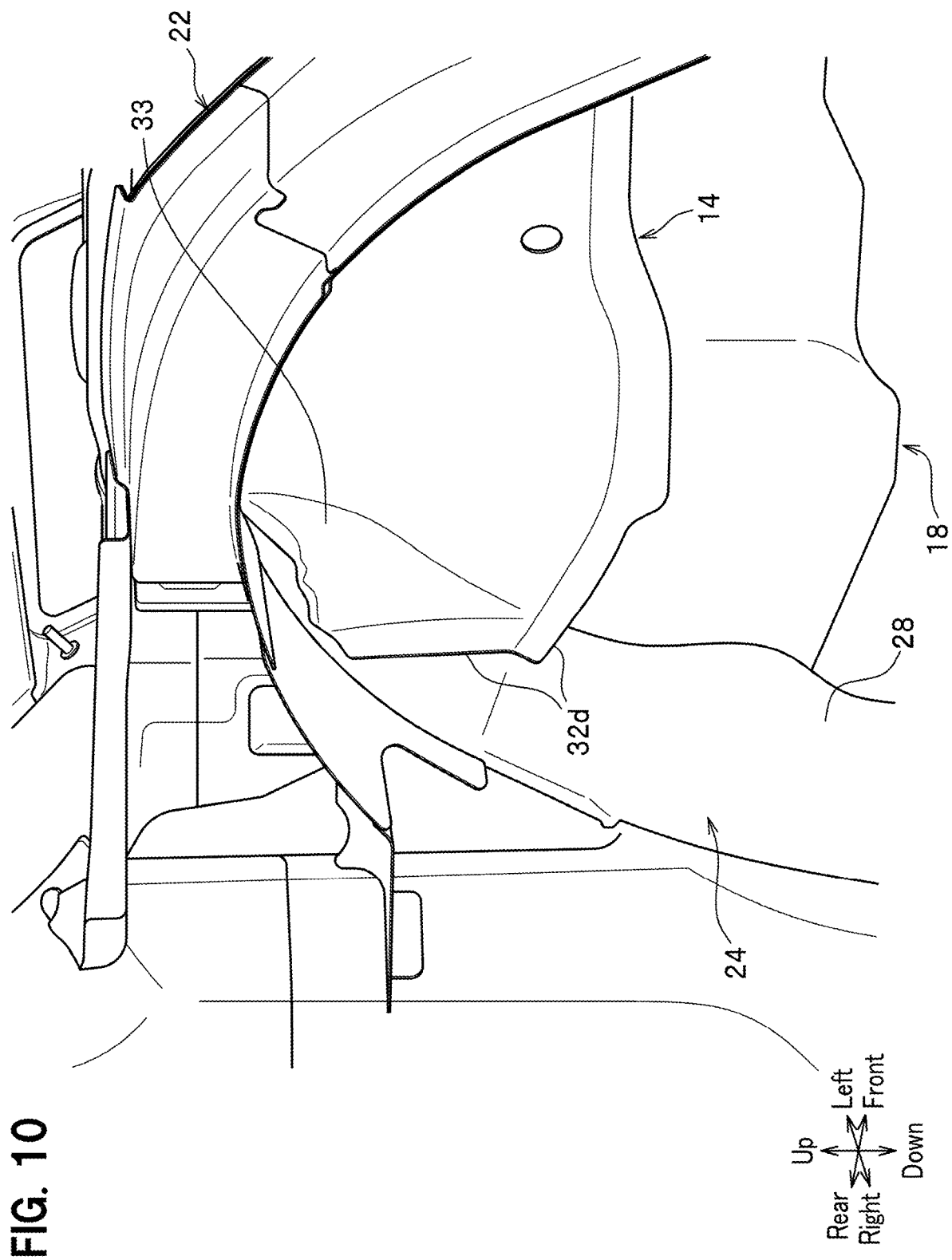
FIG. 10 is a perspective view of a vehicle front-rear direction rear end of the damper housing illustrated in FIG. 3 as viewed obliquely from the front side of the vehicle.

As shown in FIG. 10, the side wall 32 (see FIG. 2) of the damper housing 14 has a rear end 32d connected to the dashboard lower 28. Moreover, as shown in FIG. 2, the damper base 12 has an outer end 12d located on the outer side in the vehicle width direction and joined to the lower member 22, and has a rear end 12c located on the rear side in the vehicle front-rear direction and joined to the dashboard upper 26 (see FIG. 1).

Figure 11:
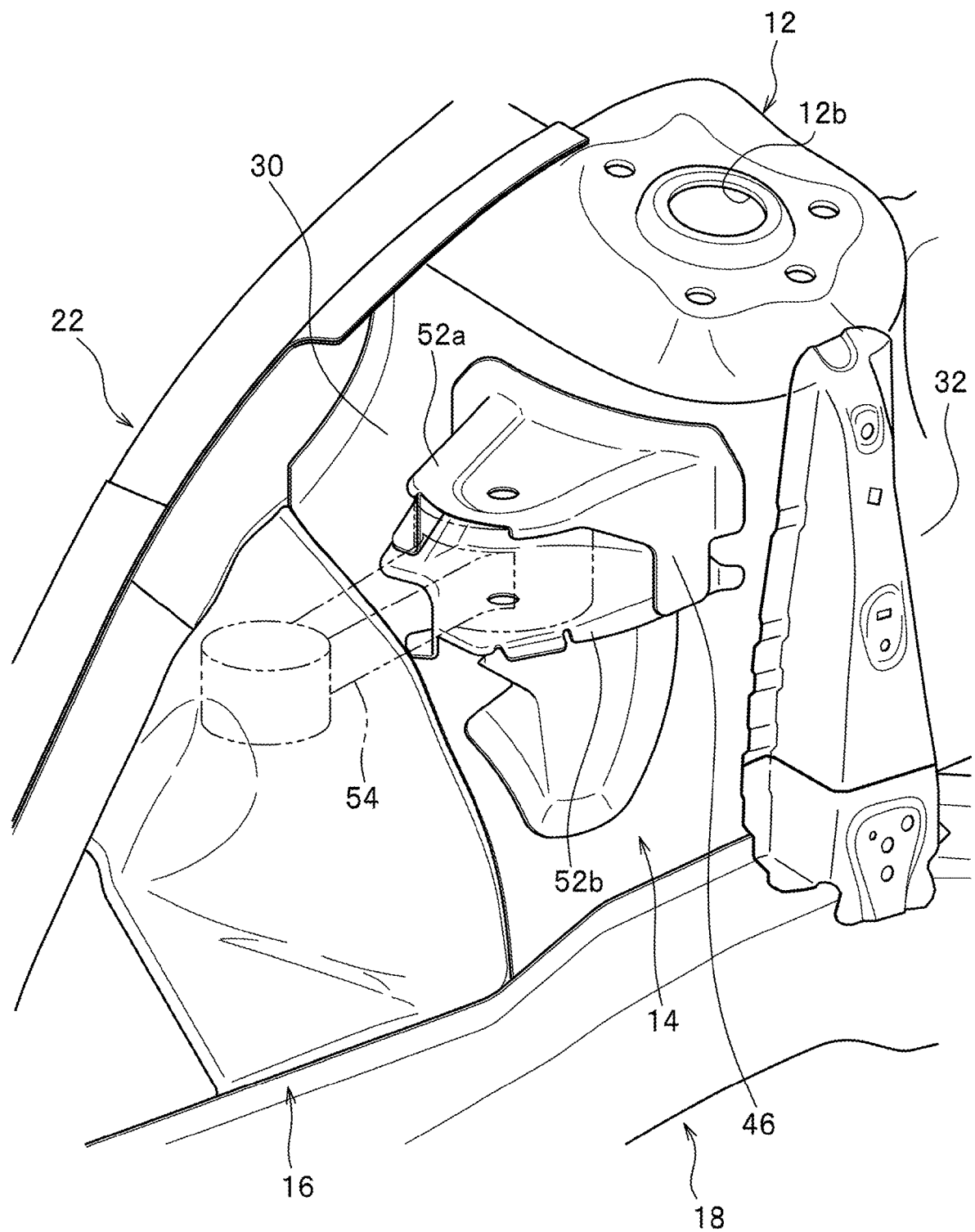
FIG. 11 is an enlarged perspective view illustrating a state where a torque rod attachment bracket is attached.

As shown in FIG. 11, disposed on a surface (vehicle inner side surface) of the front wall 30 of the damper housing 14 located on the side of the power plant room P (FIG. 1) is a torque rod attachment bracket 46 of the engine. A reinforcing panel 48 is joined to a surface (vehicle outer side surface) of the damper housing 14 which is opposite to and facing the location where the torque rod attachment bracket 46 is attached, as shown in FIG. 7. The reinforcing panel 48 has a laterally elongated, rectangular shape and is disposed on outer upper portions of the front wall 30 (FIG. 11) and the side wall 32. The reinforcing panel 48 has a plurality of circular recesses 50 recessed toward the damper housing 14. The reinforcing panel 48 is welded to the damper housing 14 at the plurality of circular recesses 50.

As shown in FIG. 11, the torque rod attachment bracket 46 is made up of an upper torque rod bracket 52a and a lower torque rod bracket 52b. A proximal end portion of a torque rod 54 is supported between the upper torque rod bracket 52a and the lower torque rod bracket 52b, via a bolt and a nut not shown.

As shown in FIG. 7, a partition wall (bulkhead) 56 is disposed in a hollow space of the lower member 22 at a portion thereof adjacent to the damper base 12. The partition wall 56 has a rectangular shape corresponding to the shape of the cross section of the hollow space of the lower member 22. The partition wall 56 has a frame portion 58 that is joined to inner walls of the hollow space of the lower member 22 and a rectangular recessed portion 60 formed in a middle portion of the partition wall 56 surrounded by the frame portion 58. The rectangular recessed portion 60 is recessed from the frame portion 58 toward the front of the vehicle.

<Advantageous Effect of the Embodiment>

Next, the features of the above described embodiment of the vehicle body front structure 10 and the effect of the features will be descried.

(1) The vehicle body front structure 10 has: a damper base 12 to which a damper (not shown) is fixed; a damper housing 14 surrounding the damper base 12 and extending downward along a periphery of the damper base 12; a front side frame 18 extending in a vehicle front-rear direction and joined to a lower end portion of the damper housing 14; a reinforcing member 11 connecting the damper base 12 to the front side frame 18 in a vertical direction. The reinforcing member 11 has a vertically elongated shape with a hat-shaped cross section and has a joint flange 11f corresponding to a periphery portion of the hat shaped cross section. The joint flange 11f is joined to a side surface of the damper housing 14, and the damper housing 14 and the reinforcing member define a closed cross section whose cross-sectional area increases in a downward direction. The joint flange 11f has an upper end portion joined to an upper surface of the damper base 12 and has a lower end portion joined to an upper surface and a side surface of the front side frame.

With this structure, the damper base 12 and the front side frame 18 are connected with each other by the reinforcing member 11 serving as a structural member, via the damper housing 14. Even when a push-up force (arrow Y2 in FIG. 7), in which a vertical force is dominant, is inputted from the damper to the damper base 12, as the connection by the reinforcing member 11 allows the damper base 12 to have high mounting point rigidity against the vertical force, the damper base 12 can fully exert its attenuation effect and thereby improve the ride quality of the vehicle V.

In particular, the reinforcing member 11 is configured to define a closed cross section with a cross-sectional area increasing from an upper portion of the reinforcing member 11 to a lower portion thereof, and a lower end portion of the joint flange 11f is joined to the upper surface 18a and the vehicle inner side surface 18b of the front side frame 18. As a result, a vertical support rigidity of the reinforcing member 11 is increased. Moreover, an upper end portion of the joint flange 11f of the one reinforcing member 11 joined to one damper base 12 is merely joined to the upper surface of the damper base 12, which contributes to reduction in weight. Therefore, the vertical rigidity of the left-right pair of damper bases 12 is enhanced independent of each other with that lightweight structure to improve ride quality.

(2) The reinforcing member 11 has: a lower portion member 11d and an upper portion member 11u. The lower portion member 11d is joined to the front side frame 18. The upper portion member 11u has a lower end portion 11u1 overlapping with an upper end portion of the lower portion member 11d from the outer side of the vehicle, and is joined to the damper housing 14. The reinforcing member 11 has an overlapping section 11c where the lower end portion 11u1 of the upper portion member 11u is overlapped with an upper end portion of the lower portion member 11d on a vehicle outer side of the lower portion member 11d. The damper housing 14 has a work hole 14b formed therein so as to face the overlapping section 11c.

With this structure, the upper portion member 11u is fixed to the damper housing 14 in advance and the lower portion member 11d is fixed to the front side frame 18 in advance, then the damper housing 14 is set to the lower portion member 11d from the outside of the vehicle so that the upper portion member 11u is overlapped with the lower portion member 11d in the overlapping section 11c on the vehicle outer side of the lower portion member 11d, and then a welding jig (not shown) is inserted through the work hole 14b to weld the upper portion member 11u to the lower portion member 11d by spot welding. As a result, as the attaching and joining of the reinforcing member 11 is easily performed, manufacturing productivity is improved.

(3) The overlapping section 11c includes a vehicle rear surface side section where the lower portion member 11d is glued to the upper portion member 11u with an adhesive 15.

With this structure, as the lower portion member 11d and the upper portion member 11u are continuously glued to each other with the adhesive 15 in the rear surface section of the overlapping section 11c, the rigidity of the structure is improved. In particular, since the rear surface section is near to passengers, contribution to the ride quality is increased.

(4) The overlapping section 11c includes a vehicle front surface side section where the lower portion member 11d and the upper portion member 11u define a gap 11g therebetween.

This structure facilitates setting the upper end portion 11u1 of the upper portion member 11u of the reinforcing member 11 to the lower end portion of the lower portion member 11d of the reinforcing member 11.

(5) The lower portion member 11d is joined to a side surface of the front side frame 18, and a plate-like reinforcing member 19 serving as another reinforcing member is joined to an inner surface opposite to that side surface. The lower portion member 11d is joined to the front side frame 18 so that the front side frame 18 is sandwiched between the lower portion member 11d and the plate-like reinforcing member 19.

With this structure, the lower portion member 11d of the reinforcing member 11 is firmly joined to the front side frame 18. As a result, the reinforcing member 11 vertically connecting between the damper base 12 and the front side frame 18 via the damper housing 14 is utilized as a structural member for attenuating a push-up force from the damper to the maximum extent possible.

(6) The damper base 12 has an upper surface 12a with a periphery portion where a slanted surface 12h is formed. A joint flange 11f of the reinforcing member 11 is joined to this slanted surface 12h to define a curved surface 11w extending continuously from the joint flange 11f to an inner surface of the reinforcing member 11.

Figure 12:
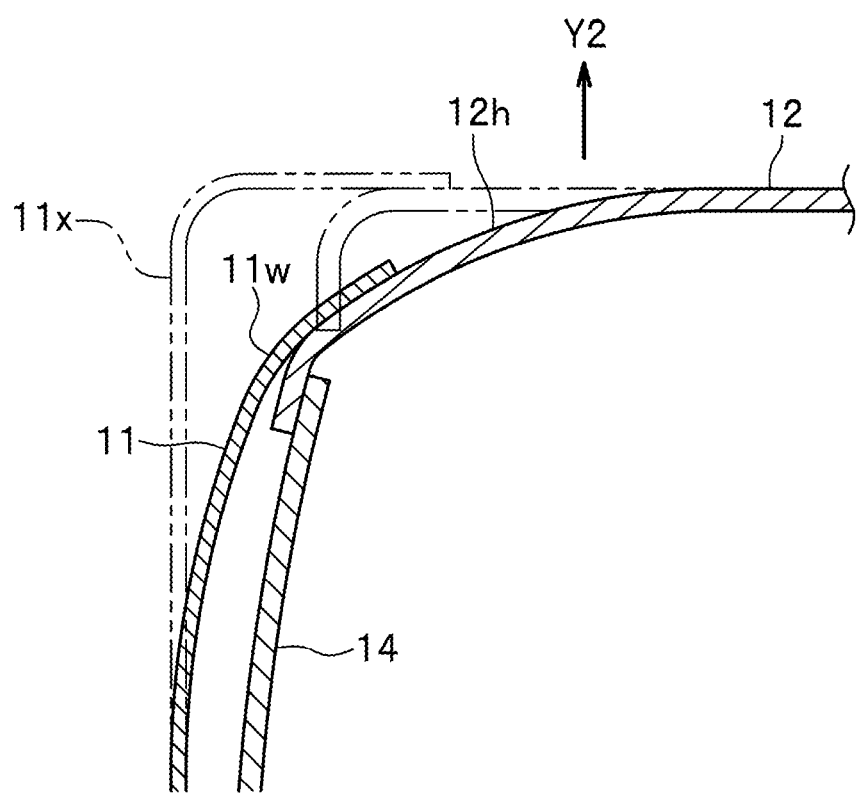
FIG. 12 is a schematic comparative view for showing the amount of deformation of the reinforcing member and the vertical rigidity of the damper base.

With this structure, as shown in FIG. 12 schematically illustrating the reinforcing member 11 joined to the damper base 12, an upper end portion of the joint flange 11f of the reinforcing member 11 is joined to the slanted surface 12h of the damper base 12 and has a small cross-sectional area, and the perimeter length of the reinforcing member 11 can be kept small due to the presence of the curved surface 11w. As a result, the amount of deformation of the reinforcing member 11 due to a push-up force Y2 (see FIG. 7) from the damper is kept small, increasing the support rigidity provided by the reinforcing member 11. In comparison to this, if a reinforcing member 11 is joined to the damper base 12 so that the reinforcing member 11 is apart from an upper end portion of the damper base 12 as shown with reference sign 11x, the amount of deformation of the reinforcing member 11 will be large. That is, the support rigidity will be low.

(7) The vehicle body front structure 10 has: a damper housing extension 16 located on the vehicle front side of the damper housing 14 and extending continuously therefrom; and a lower member 22 disposed on an outer side of the front side frame 18 in the vehicle width direction and serving as a lateral frame with a curved portion 20. The damper base 12 has a joint flange 34 bent downward from the periphery of the damper base 12. The damper housing 14 includes: a front surface (front wall 30) facing forward in the vehicle forward direction; and a side surface (side wall 32) facing inward in the vehicle width direction. At least an upper end of the front surface of the damper housing 14 and an upper end of the side surface of the damper housing 14 are joined to the joint flange 34. The front surface has an outer end located on the outer side in the vehicle width direction and has another joint flange 36 provided at the outer end and bent upward therefrom. The joint flange 36 is joined to an inner side surface of the curved portion 20 of the lower member 22. A lower end of the front surface and a lower end of the side surface are joined to an outer surface side of the front side frame 18. The damper housing extension 16 is joined to a lower surface of a front end of the front surface of the damper housing 14, a lower surface of a front end of the side surface of the damper housing 14, a lower surface of the lower member 22, and an outer surface of the front side frame 18.

With this structure, a falling surface F (see the bold dotted lines F shown in FIGS. 1 and 7) can connect between the lower member 22 and the front side frame 18 (suspend the front side frame 18 and the lower member 22), which inhibits a motion mode in which the lower member 22 and the front side frame 18 move in opposite phases upon receipt of a load from the damper and thus improves the strength and the rigidity. Moreover, sound transmitted from an engine not shown and/or a suspension mechanism not shown can be blocked to improve the NV (Noise and Vibration) characteristics. Moreover, as plates are combined without an escape in the section A shown in FIG. 2, even a thin plate of a plate thickness of 0.65t can be used to ensure high rigidity.

(8) The vehicle body front structure 10 further has a dashboard 24 disposed on a rear side of the front side frame 18 in the vehicle front-rear direction. The dashboard 24 includes: a dashboard upper 26 that constitutes an upper portion of the dashboard 24; and a dashboard lower 28 that constitutes a lower portion of the dashboard 24. The side surface (side wall 32) of the damper housing 14 has a rear end 32d connected to the dashboard lower 28. The damper base 12 has an outer end 12d located on an outer side of the damper base 12 in the vehicle width direction and joined to the lower member 22, and has a rear end 12c located on the a rear side of the damper base 12 in the vehicle front-rear direction and joined to the dashboard upper 26.

According to this structure, the rear end 32d of the side wall 32 of the damper housing 14 is joined to the dashboard lower 28. In addition, the vehicle width direction outer end 12d of the damper base 12 is joined to the lower member 22, and the vehicle front-rear direction rear end 12c of the damper base 12 is joined to the dashboard upper 26. As a result, the support rigidity of the damper base 12 that supports and fixes the damper can be improved.

(9) The vehicle body front structure 10 further has a reinforcing panel 48 disposed on a vehicle outer side surface of the damper housing 14 at a portion thereof facing a torque rod attachment bracket 46 disposed on a vehicle inner side surface of the damper housing 14.

With this structure, the reinforcing panel 48 is joined to the vehicle outer side surface of the damper housing 14 at a location thereof corresponding to the torque rod attachment bracket 46 across the damper housing 14. As a result, the vibration of the power unit (e.g., engine) installed in the power plant room P can be attenuated.

(10) The lower member 22 has a partition wall (bulkhead) 56 at a portion of the lower member 22 located adjacent to the damper base 12.

This structure can improve the support rigidity of the damper base 12 that supports and fixes the damper not shown.

A vehicle body structure according to the present embodiment has been described. The present invention is not limited thereto and may be modified appropriately as needed without departing from the spirit of the present invention.

LIST OF REFERENCE SIGNS 10 vehicle body front structure
11 reinforcing member
11c overlapping section of reinforcing member
11d lower portion member of reinforcing member
11u upper portion member of reinforcing member
11f joint flange of reinforcing member
11g gap
12 damper base
12a base body
12c rear end of damper base
12d outer end of damper base
12e flat surface
12h slanted surface
14 damper housing
16 damper housing extension
18 front side frame
19 plate-like reinforcing member
19a beaded portion
20 curved portion
22 lower member (lateral frame)
22a inner side surface of lower member
22b lower surface of lower member
24 dashboard
26 dashboard upper
28 dashboard lower
30 front wall
30a upper end of front wall
30b outer end of front wall
30c lower end of front wall
30d front end of front wall
32 side wall
32a upper end of side wall
32b lower end of side wall
32c front end of side wall
32d rear end of side wall
34 joint flange
36 another joint flange
46 torque rod attachment bracket
48 reinforcing panel
56 partition wall
V vehicle
P power plant room
C vehicle compartment
W left front wheel
F falling surface

The invention claimed is:

1. A vehicle body front structure, comprising:
a damper base to which a damper is fixed;
a damper housing surrounding the damper base and extending downward along a periphery of the damper base;
a front side frame extending in a vehicle front-rear direction and joined to a lower end portion of the damper housing; and
a reinforcing member connecting the damper base to the front side frame in a vertical direction,
wherein the reinforcing member has a vertically elongated shape with a hat-shaped cross section and has a joint flange corresponding to a periphery portion of the hat-shaped cross section,
wherein the joint flange is joined to a side surface of the damper housing, and the damper housing and the reinforcing member define a closed cross section whose cross-sectional area increases in a downward direction,
wherein the joint flange has an upper end portion joined to an upper surface of the damper base and has a lower end portion joined to an upper surface and a side surface of the front side frame,
wherein the reinforcing member has a lower portion member with an upper end portion and an upper portion member with a lower end portion, and has an overlapping section where the lower end portion of the upper portion member overlaps with the upper end portion of the lower portion member on a vehicle outer side of the lower portion member, the upper portion member joined to the damper housing, the lower portion member joined to the front side frame,
wherein the damper housing has a through-hole facing the overlapping section, and
wherein the overlapping section includes a vehicle rear surface side section where the lower portion member is glued to the upper portion member with an adhesive.

2. The vehicle body front structure according to claim 1, wherein the overlapping section includes a vehicle front surface side section where the lower portion member and the upper portion member define a gap therebetween.

3. The vehicle body front structure according to claim 1, wherein the vehicle body front structure further comprises a plate-like reinforcing member joined to an inner surface of the front side frame opposite to the side surface thereof to which the lower portion member is joined, and
wherein the lower portion member is joined to the side surface of the front side frame so that the front side frame is sandwiched between the lower portion member and the plate-like reinforcing member.

4. The vehicle body front structure according to claim 1, wherein the upper surface of, the damper base has a periphery portion where a slanted surface is formed, and wherein the joint flange of the reinforcing member is joined to the slanted surface to define a curved surface of the reinforcing member, the curved surface continuously extending from the joint flange of the reinforcing member to an inner surface thereof.

5. The vehicle body front structure according to claim 1, further comprising:

a damper housing extension located on a front side of the damper housing in the vehicle front-rear direction and extending continuously therefrom; and a lateral frame disposed on an outer side of the front side frame in the vehicle width direction and having a curved portion, wherein the damper base has a first joint flange bent downward from the periphery of the damper base, wherein the damper housing includes a front surface facing forward in the vehicle front-rear direction and a side surface facing inward in the vehicle width direction, wherein at least an upper end of the front surface of the damper housing and an upper end of the side surface of the damper housing are joined to the first joint flange, wherein the front surface has a vehicle width direction outer end at which, a second joint flange is formed bent upward therefrom and joined to an inner side surface of the curved portion of the lateral frame, wherein a lower end of t he front surface and a lower end of the side surface are joined to an outer surface of the front side frame, and wherein the damper housing extension is joined to: a lower surface of a front end of the front surface of the damper housing; a lower surface of a front end of the side surface of the damper housing; a lower surface of the lateral frame; and an outer surface of the front side frame.

6. The vehicle body front structure according to claim 1, further comprising:

a dashboard disposed on a rear side of the front side frame in the vehicle front-rear direction, wherein the dashboard comprises:

a dashboard upper that constitutes an upper portion of the dashboard; and a dashboard lower that constitutes a lower portion of the dashboard, wherein the side surface of the damper housing has a rear end connected to the dashboard lower, and wherein the damper base has a vehicle width direction outer end joined to the lateral frame, and has a vehicle front-rear direction rear end joined to the dashboard upper.

7. The vehicle body front structure according to claim 1, further comprising a reinforcing panel disposed on a vehicle outer side surface of the damper housing at a portion thereof facing a torque rod attachment bracket disposed on a vehicle inner side surface of the damper housing.

8. The ye hide body front structure according to claim 1, wherein the lateral frame has a partition wall at a portion of the lateral frame located adjacent to the damper base.

* * * * *